United States Patent
Duan et al.

(10) Patent No.: US 10,060,438 B2
(45) Date of Patent: Aug. 28, 2018

(54) FAN CONTROL METHOD, APPARATUS, AND SYSTEM

(71) Applicant: Huawei Technologies Co., Ltd., Shenzhen, Guangdong (CN)

(72) Inventors: Weifeng Duan, Shenzhen (CN); Xi Chao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 688 days.

(21) Appl. No.: 14/607,425

(22) Filed: Jan. 28, 2015

(65) Prior Publication Data

US 2015/0147155 A1    May 28, 2015

Related U.S. Application Data

(63) Continuation of application No. PCT/CN2013/070877, filed on Jan. 23, 2013.

(30) Foreign Application Priority Data

Aug. 29, 2012 (CN) .......................... 2012 1 0312464

(51) Int. Cl.
  *F04B 49/00* (2006.01)
  *F04D 27/00* (2006.01)
  (Continued)

(52) U.S. Cl.
  CPC ........... *F04D 27/00* (2013.01); *F04D 19/002* (2013.01); *F04D 27/004* (2013.01); *G05B 15/02* (2013.01)

(58) Field of Classification Search
  CPC ...... F04D 19/002; F04D 27/004; F04D 27/00; G05B 15/02
  See application file for complete search history.

(56) References Cited

U.S. PATENT DOCUMENTS

6,265,841 B1    7/2001 Buthker
6,428,282 B1*   8/2002 Langley .............. F04D 27/004
                                                         417/2
(Continued)

FOREIGN PATENT DOCUMENTS

CN    1298569 A     6/2001
CN    201318303 Y   9/2009
(Continued)

OTHER PUBLICATIONS

14607425-4-wire Pulse Width Modulation (PWM) Controlled Fan—Jul. 2004.*

*Primary Examiner* — Charles Freay (57) ABSTRACT

A fan control method, apparatus, and system, so as to implement speed regulation and rotation direction control on a four-wire system counter-rotating fan with a conventional four-wire fan interface by using a PWM control bus. The method provided by the embodiments of the present invention includes: receiving a first fan regulation and control signal sent by a system control module; converting the first fan regulation and control signal to a forward-rotating control signal, a counter-rotating control signal, or a rotation direction switchover control signal according to a duty cycle range of the first fan regulation and control signal and a current rotation direction of the fan; and sending a control signal obtained by the conversion to a fan driving module, so that the fan driving module drives, according to the control signal obtained by the conversion, the fan to operate.

14 Claims, 5 Drawing Sheets

(51) Int. Cl.
*F04D 19/00* (2006.01)
*G05B 15/02* (2006.01)

(56) References Cited

U.S. PATENT DOCUMENTS

| | | | | |
|---|---|---|---|---|
| 6,737,860 B2* | 5/2004 | Hsu | ............... | H05K 7/20209 324/161 |
| 7,332,809 B2* | 2/2008 | Shimazaki | ............ | C03B 11/082 257/729 |
| 7,375,486 B2* | 5/2008 | Ku | ............ | G06F 1/206 318/471 |
| 2003/0137267 A1* | 7/2003 | Blake | ............... | F04D 27/004 318/471 |
| 2004/0009074 A1* | 1/2004 | Dodson | ............ | F04D 27/004 417/22 |
| 2004/0264948 A1 | 12/2004 | Lin et al. | | |
| 2006/0176186 A1* | 8/2006 | Larson | ............ | F04D 27/004 340/635 |
| 2008/0188994 A1* | 8/2008 | Singh | ............... | F04D 27/004 700/300 |
| 2008/0306635 A1* | 12/2008 | Rozzi | ............... | G06F 1/206 700/300 |
| 2008/0310967 A1* | 12/2008 | Franz | ............... | F04D 27/004 417/32 |
| 2010/0013423 A1 | 1/2010 | Chen | | |
| 2010/0060224 A1* | 3/2010 | Chen | ............... | F04D 25/088 318/504 |
| 2012/0068642 A1 | 3/2012 | Chen et al. | | |

FOREIGN PATENT DOCUMENTS

| | | |
|---|---|---|
| CN | 102042248 A | 5/2011 |
| CN | 201953700 U | 8/2011 |
| CN | 202213535 U | 5/2012 |
| CN | 202221973 U | 5/2012 |
| CN | 102817862 A | 12/2012 |
| EP | 0 220 944 A1 | 5/1987 |
| TW | 201214947 A | 4/2012 |

* cited by examiner

FAN CONTROL METHOD, APPARATUS, AND SYSTEM

CROSS-REFERENCE TO RELATED APPLICATIONS

This application is a continuation of International Application No. PCT/CN2013/070877, filed on Jan. 23, 2013, which claims priority to Chinese Patent No. 201210312464.7, filed on Aug. 29, 2012, both of which are hereby incorporated by reference in their entireties.

TECHNICAL FIELD

The present invention relates to the fields of communications technologies and computer technologies, and in particular, to a fan control method, apparatus, and system.

BACKGROUND

Generally, in a system involving a communications device and an information technology (IT, Information Technology) device, a fan is used to help with heat dissipation of the devices. With an increase in network traffic, power consumption of the communications device becomes higher, which requires higher performance of the fan. A rotational speed of the fan reaches over 10,000 RPM. The fan is required to support counter-rotating to prevent intake of dust into the device from affecting service life of the fan, thereby achieving an automatic dust removal function. In addition, generally, an operating environmental condition of an outdoor communications module is adverse, and a variation of a temperature difference in different areas or between day and night is large, which also affects the service life of the fan, and indirectly affects reliability of the device. Therefore, in the system, the fan requires long service life and high reliability, so as to adapt to a more adverse environmental condition, and how to extend the service life of the fan in a current fan condition becomes a major issue currently.

In the prior art, a fan control system is formed by a fan unit, a fan interface, and an external control unit. The fan unit uses a five-wire system counter-rotating fan and is formed by one or more fans. Each fan needs to connect a dedicated five-wire interface connector. The fan acquires an external power supply by using the fan interface. The external system control unit implements rotational speed control on the fan by using a fan interface pulse width modulation (PWM, Pulse Width Modulation) control bus, implements alarm detection on the fan by using a fan rotational speed frequency signal (FG, Frequency Signal) bus of the fan interface, and implements forward and counter-rotating control on the fan by using a fan interface rotation direction control line.

However, the prior art is applicable to a five-wire system fan, and an application interface applicable to a four-wire system fan commonly used in the industry can use only two among the PWM, FG, and rotation direction control buses and cannot be compatible with all functions. Therefore, smooth upgrade cannot be achieved during application of a product on an existing network, and forward and reverse air ducts cannot be compatible without changing fan design.

SUMMARY

Embodiments of the present invention provide a fan control method, apparatus, and system, so as to implement speed regulation and rotation direction control on a four-wire system counter-rotating fan with a conventional four-wire fan interface by using a PWM control bus.

A first aspect of the present invention provides a fan control method, including: receiving a first fan regulation and control signal sent by a system control module, where the first fan regulation and control signal is used to control a rotation direction of a fan, and the system control module is configured to deliver a control signal according to an instruction of a host computer to control operating of the fan; converting the first fan regulation and control signal to a forward-rotating control signal, a counter-rotating control signal, or a rotation direction switchover control signal according to a duty cycle range of the first fan regulation and control signal and a current rotation direction of the fan; and sending a control signal obtained by the conversion to a fan driving module, so that the fan driving module drives, according to the control signal obtained by the conversion, the fan to operate.

In a first possible implementation manner, after the sending a control signal obtained by the conversion to a fan driving module, the method further includes: receiving a second fan regulation and control signal sent by the system control module, where the second fan regulation and control signal is used to regulate a rotational speed of the fan; and sending a speed regulation driving signal to the fan driving module according to a duty cycle range of the second fan regulation and control signal, so that the fan driving module drives the fan to operate at a rotational speed corresponding to the duty cycle range of the second fan regulation and control signal.

With reference to the first aspect or the first possible implementation manner of the first aspect, in a second possible implementation manner, the method further includes: receiving a third fan regulation and control signal sent by the system control module, where the third fan regulation and control signal is used to control the rotation direction and the rotational speed of the fan; converting the third fan regulation and control signal to a forward-rotating speed regulation driving signal, a counter-rotating speed regulation driving signal, or a rotation direction switchover and speed regulation driving signal according to a duty cycle range of the third fan regulation and control signal and a current rotation direction of the fan; and sending a speed regulation driving signal obtained by the conversion to the fan driving module, so that the fan driving module regulates the rotation direction and the rotational speed of the fan according to the speed regulation driving signal obtained by the conversion.

With reference to the second possible implementation manner of the first aspect, in a third possible implementation manner, the method further includes: sending rotational speed information of the fan to the system control module, so that the system control module reports the rotational speed information of the fan to the host computer.

With reference to the third possible implementation manner of the first aspect, in a fourth possible implementation manner, the method further includes: when it is detected that the first fan regulation and control signal, the second fan regulation and control signal, or the third fan regulation and control signal is a fault signal, sending a fan full speed driving control signal to the fan driving module, so that the fan operates at full speed.

A second aspect of the present invention provides a fan control apparatus, including: a receiving unit, configured to receive a first fan regulation and control signal sent by a system control module, where the first fan regulation and control signal is used to control a rotation direction of a fan, and the system control module is configured to deliver a control signal according to an instruction of a host computer to control operating of the fan; a converting unit, configured to convert the first fan regulation and control signal received by the receiving unit to a forward-rotating control signal, a counter-rotating control signal, or a rotation direction switchover control signal according to a duty cycle range of the first fan regulation and control signal and a current rotation direction of the fan; and a sending unit, configured to send a control signal obtained by the conversion by the converting unit to a fan driving module, so that the fan driving module drives, according to the control signal obtained by the conversion, the fan to operate.

In a first possible implementation manner, the receiving unit is further configured to receive a second fan regulation and control signal sent by the system control module, where the second fan regulation and control signal is used to regulate a rotational speed of the fan; and the sending unit is further configured to send a speed regulation driving signal to the fan driving module according to a duty cycle range of the second fan regulation and control signal, so that the fan driving module drives the fan to operate at a rotational speed corresponding to the duty cycle range of the second fan regulation and control signal.

With reference to the second aspect or the first possible implementation manner of the second aspect, in a second possible implementation manner, the receiving unit is further configured to receive a third fan regulation and control signal sent by the system control module, where the third fan regulation and control signal is used to control the rotation direction and the rotational speed of the fan; the converting unit is further configured to convert the third fan regulation and control signal to a forward-rotating speed regulation driving signal, a counter-rotating speed regulation driving signal, or a rotation direction switchover and speed regulation driving signal according to a duty cycle range of the third fan regulation and control signal received by the receiving unit and a current rotation direction of the fan; and the sending unit is further configured to send a speed regulation driving signal obtained by the conversion by the converting unit to the fan driving module, so that the fan driving module regulates the rotation direction and the rotational speed of the fan according to the speed regulation driving signal obtained by the conversion.

With reference to the second aspect or the second possible implementation manner of the second aspect, in a third possible implementation manner, the sending unit is further configured to send rotational speed information of the fan to the system control module, so that the system control module reports the rotational speed information of the fan to the host computer.

With reference to the second aspect or the third possible implementation manner of the second aspect, in a fourth possible implementation manner, the sending unit is further configured to: when it is detected that the first fan regulation and control signal, the second fan regulation and control signal, or the third fan regulation and control signal is a fault signal, send a fan full speed driving control signal to the fan driving module, so that the fan operates at full speed.

A third aspect of the present invention provides a fan control system, including:

a host computer, a system management apparatus, a fan interface connection apparatus, and a fan, where the host computer is configured to send a rotation direction control command to the system management apparatus; the system management apparatus is configured to send a first fan regulation and control signal to the fan by using the fan interface connection apparatus and according to the rotation direction control command; the fan interface connection apparatus is configured to connect the system management apparatus to the fan, and includes a power supply positive interface, a power supply negative interface, a fan control signal interface, and a fan rotational speed frequency feedback signal interface, where one side of the power supply positive interface and one side of the power supply negative interface are respectively connected to a positive electrode and a negative electrode of a power supply in the system management apparatus by using a power supply bus, another side of the power supply positive interface and another side of the power supply negative interface are respectively connected to a positive electrode and a negative electrode of the fan by using a power supply bus, one side of the fan control signal interface and one side of the fan rotational speed frequency feedback signal interface are connected to a signal control interface in the system management apparatus by using a control bus, and another side of the fan control signal interface and another side of the fan rotational speed frequency feedback signal interface are connected to the fan by using a control bus; and the fan is a four-wire system fan and is configured to receive a first fan regulation and control signal sent by the system management apparatus, convert the first fan regulation and control signal to a forward-rotating control signal, a counter-rotating control signal, or a rotation direction switchover control signal according to a duty cycle range of the first fan regulation and control signal and a current rotation direction of the fan, and regulate the rotation direction of the fan according to a control signal obtained by the conversion.

In a first possible implementation manner, the host computer is further configured to send a speed regulation control command to the system management apparatus; the system management apparatus is further configured to send a second fan control signal to the fan by using the fan interface connection apparatus and according to the speed regulation control command; and the fan is further configured to receive the second fan regulation and control signal sent by the system management apparatus and enable, according to a duty cycle range of the second fan regulation and control signal, the fan to operate at a rotational speed corresponding to the duty cycle range of the second fan regulation and control signal.

It can be seen from the foregoing technical solutions that, the embodiments of the present invention have the following advantages: A fan control module receives a first fan regulation and control signal sent by a system control module, distinguishes, according to a duty cycle range of the first fan regulation and control signal and a current rotation direction of the fan, a PWM signal that controls different rotation directions of the fan from the first fan regulation and control signal, and sends the PWM signal to a fan driving module. Therefore, a counter-rotating control function is implemented by setting PWM signals with different duty cycle ranges, and forward and reverse air ducts are compatible under a precondition that a counter-rotating fan interface and an existing four-wire system interface are consistent, thereby implementing smooth upgrade and transformation of a device on an existing network and reducing operation and maintenance costs.

DETAILED DESCRIPTION

Embodiments of the present invention provide a fan control method, apparatus, and system, so as to implement speed regulation and rotation direction control on a counter-rotating fan by using a control bus and achieve consistency between a fan interface and an existing conventional four-wire fan interface. In the embodiments of the present invention, a PWM signal is generally used as a fan regulation and control signal, or another intelligent control signal such as a 485 serial communications bus (RS-485 bus) and an I2C (Inter-Integrated Circuit) bus may also be used, which is not specifically limited herein. The following gives detailed descriptions.

Figure 1:
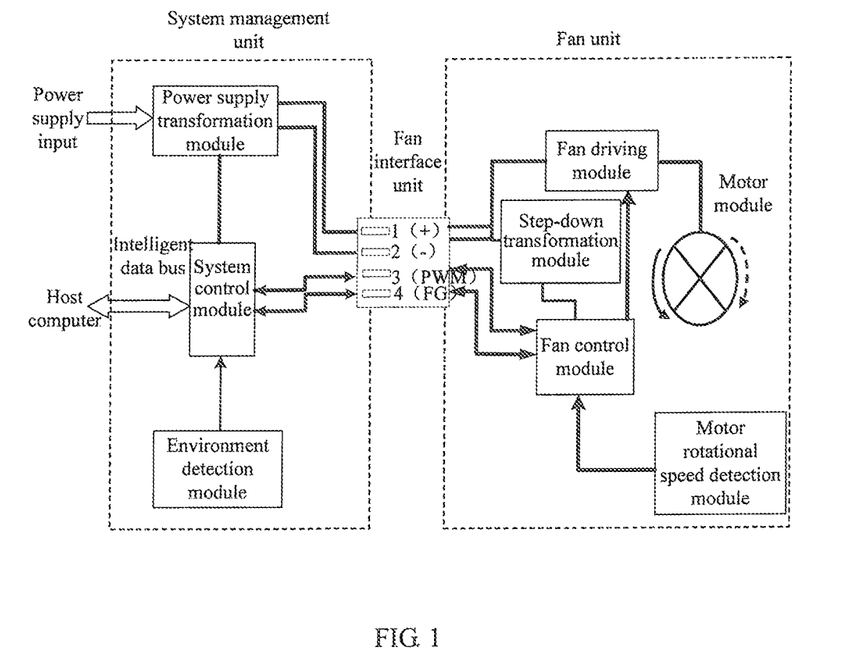
FIG. 1 is a schematic structural diagram of a fan control system according to an embodiment of the present invention.

First, referring to FIG. 1, logical units of a fan control system in an embodiment of the present invention include a system management unit, a fan interface unit, and a fan unit.

The system management unit is formed by a system control module, a power supply transformation module, and an environment detection module; the fan unit is formed by one or more fan modules, and each fan module is formed by a fan control module, a fan driving module, a step-down transformation module, a motor module, and a motor rotational speed detection module; and functions of the modules are as follows:

The system is formed by the following units: a system management unit, a fan unit, and a fan interface unit.

Functions of modules of the system management unit are as follows:

The power supply transformation module performs voltage transformation by connecting to an external input power supply, provides a required power supply for the system control module, and provides a required power supply for the fan unit.

The environment detection unit detects operating environmental data of an electronic device in real time, and reports the operating environmental data to the system control module by using a control bus.

The system control module is a management center of the fan control system, receives, by using an intelligent data bus, an instruction sent by a host computer, or reports operating information of the fan control system to the host computer; implements forward-rotating and counter-rotating control of the fan and fan rotational speed control by using a PWM signal control bus; implements fan rotational speed detection by using an FG control bus; and implements speed regulation control on the fan unit by acquiring information reported by the environment detection module.

Functions of modules of the fan unit are as follows:

The fan driving module is connected to a power supply busbar by using the fan interface unit, receives a control signal from the fan control module, converts, by transforming the control signal, a busbar power supply to a voltage required by the motor module, and controls operating of the motor module according to the received fan control signal.

The step-down transformation module connects to the power supply busbar by using the fan interface unit, implements a function of power supply step-down transformation, and provides a required power supply for the fan control module.

The fan control module receives, by using the fan interface unit, a fan control command sent by the system control module of the system management unit, implements forward and counter-rotating control and rotational speed control on the fan, receives information reported by a motor rotational speed detection module, analyzes and processes the reported information, and reports fan operating state information to the system control module of the system management unit by using the fan interface unit.

The motor module is formed by a motor and a fan blade. The motor adopts a single-phase motor or a three-phase motor that meets a counter-rotating function, receives the control command sent by the fan control module, and implements rotation direction and rotational speed transformation of the fan.

The motor rotational speed module implements detection on a motor phase and reports detected information to the fan control module.

A function of the fan interface unit is as follows:

The fan interface unit is formed by dedicated male and female connectors. The male and female connectors are located on fan unit and system management unit sides; the fan interface uses a 4-pin dedicated connector. Four wires of the dedicated connector are defined as a power supply positive electrode, a power supply negative electrode, a PWM signal input and output, and an FG signal input and output. A definition sequence is flexible and is not limited to the foregoing sequence.

The power supply bus implements connection to the external power supply and transmits the power supply to the system management unit and each module of the fan unit.

The control bus is configured to transfer control information among the system control module, environment detection module, fan control module, and motor rotational speed detection module, where the control information includes but is not limited to PWM and FG.

The intelligent data bus implements data transmission between the system control module and the host computer, including but not limited to the 485 serial communications bus (RS-485 bus), a serial peripheral interface (SPI, Serial Peripheral Interface), an Ethernet interface (FE, Fast Ethernet), and the like.

Figure 2:
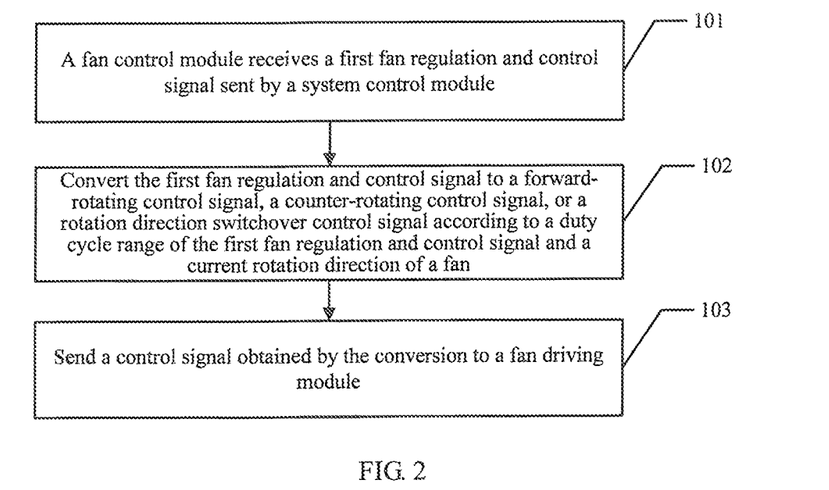
FIG. 2 is a schematic diagram of a fan control method according to an embodiment of the present invention.

Referring to FIG. 2, a fan control method provided in an embodiment of the present invention includes:

101: Receive a first fan regulation and control signal sent by a system control module.

After a system is powered on, the system control module sends the fan regulation and control signal to a fan control module by using a fan interface; the system control module may further acquire, by using a control bus, information reported by an environment detection module, may also receive, by using an intelligent data bus, a fan speed regulation command sent by a host computer, and may further receive, by using the control bus, fan rotational speed information reported by a motor rotational speed detection module and the fan control module.

The fan control module receives the first fan regulation and control signal sent by the system control module, where the first fan regulation and control signal is used to control a rotation direction of a fan, and the system control module is configured to deliver a control signal according to an instruction of the host computer to control operating of the fan.

102: Convert the first fan regulation and control signal to a forward-rotating control signal, a counter-rotating control signal, or a rotation direction switchover control signal according to a duty cycle range of the first fan regulation and control signal and a current rotation direction of a fan.

It should be noted that, the first fan regulation and control signal is a PWM signal. The PWM signal may be classified, according to different duty cycle ranges of the PWM signal, into regulation and control signals for identifying different regulation and control information.

In this embodiment, it can be determined, according to the duty cycle range of the first fan regulation and control signal and the current rotation direction of the fan, that the first fan regulation and control signal is converted to the forward-rotating control signal, counter-rotating control signal, or rotation direction switchover control signal, where the forward-rotating control signal is used to control the fan to rotate clockwise, the counter-rotating control signal is used to control the fan to rotate anticlockwise, and the rotation direction switchover control signal is used to control the fan to change the rotation direction, indicating that the fan switches from anticlockwise rotation to clockwise rotation or switches from clockwise rotation to anticlockwise rotation.

Specifically, when the fan is in a non-operating state and the fan control module receives the first fan regulation and control signal sent by the system control module, if the first fan regulation and control signal is a first PWM signal, for example, a PWM signal whose duty cycle range is from 8% to 14%, indicating that the fan rotates in a forward direction (forward-rotating), the fan control module determines that the fan rotates in the forward direction, converts the first fan regulation and control signal to the forward-rotating control signal, and sends the forward-rotating control signal to the fan driving module; and if the first fan regulation and control signal is a second PWM signal, for example, a PWM signal whose duty cycle range is from 17% to 22%, indicating that the fan rotates in a reverse direction (counter-rotating), the fan control module determines that the fan rotates in the reverse direction, converts the first fan regulation and control signal to the counter-rotating control signal, and sends the counter-rotating control signal to the fan driving module.

When the fan is in an operating state and the fan control module receives the first fan regulation and control signal from the system control module, the fan control module determines, according to the duty cycle range of the first fan regulation and control signal and the current rotation direction of the fan, that the first fan regulation and control signal is the rotation direction switchover control signal for mutual switchover of a forward direction and a reverse direction. For example, if a second PWM signal is received when the fan rotates in the forward direction and a first PWM signal is received when the fan rotates in the reverse direction, it is determined that the first fan regulation and control signal is the fan rotation direction switchover control signal, the first fan regulation and control signal is converted to a corresponding rotation direction control signal, and the rotation direction control signal is sent to the fan driving module.

It should be noted that, in the embodiment of the present invention, the forward-rotating of the fan refers to clockwise rotation, and the counter-rotating refers to anticlockwise rotation.

103: Send a control signal obtained by the conversion to a fan driving module, so that the fan driving module drives, according to the control signal obtained by the conversion, the fan to operate.

The forward-rotating control signal, counter-rotating control signal, or rotation direction switchover control signal obtained by the conversion is sent to the fan driving module, and the fan driving module performs power output transformation and drives the motor module of the fan to perform corresponding rotation.

In the embodiment of the present invention, a fan control module receives a first fan regulation and control signal or a second fan regulation and control signal sent by a system control module, converts, according to a duty cycle range of the first fan regulation and control signal and a current rotation direction of a fan, the first fan regulation and control signal to a PWM signal that controls different rotation directions of the fan, and sends the PWM signal to a fan driving module, so as to implement a control function for controlling a direction of the fan, solve a problem that a counter-rotating signal input and output interface needs to be specifically provided in a fan interface, implement rotation direction control on the fan by using a four-wire system interface, be compatible with forward and reverse air ducts under a precondition that a counter-rotating fan interface and an existing four-wire system interface are consistent, implement smooth upgrade and transformation of a device on an existing network, and reduce operation and maintenance costs.

Figure 3:
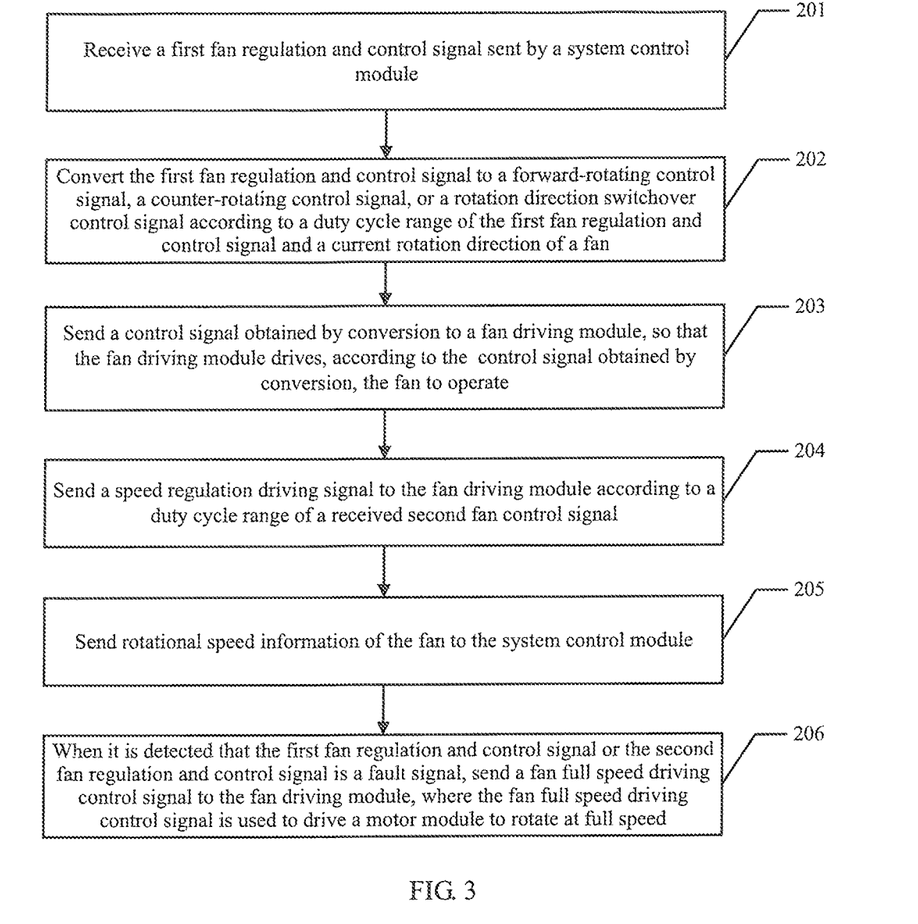
FIG. 3 is a schematic diagram of a fan control method according to an embodiment of the present invention.

For ease of understanding, the following uses another embodiment to describe in detail the fan control method according to the embodiment of the present invention. Referring to FIG. 3, the fan control method provided in the another embodiment of the present invention includes:

201: Receive a first fan regulation and control signal sent by a system control module.

After a system is powered on, the system control module sends the fan regulation and control signal to a fan control module by using a fan interface; the system control module may further acquire, by using a control bus, information reported by an environment detection module, may also receive, by using an intelligent data bus, a fan speed regulation command sent by a host computer, and may further receive, by using the control bus, fan rotational speed information reported by a motor rotational speed detection module and the fan control module.

The fan control module receives the first fan regulation and control signal sent by the system control module, where the first fan regulation and control signal is used to control a rotation direction of a fan, and the system control module is configured to deliver a control signal according to an instruction of the host computer to control operating of the fan.

202: Convert the first fan regulation and control signal to a forward-rotating control signal, a counter-rotating control signal, or a rotation direction switchover control signal according to a duty cycle range of the first fan regulation and control signal and a current rotation direction of a fan.

It should be noted that, the fan regulation and control signal is a PWM signal. The PWM signal may be classified, according to different duty cycle ranges of the PWM signal, into regulation and control signals for identifying different regulation and control information.

In this embodiment, it can be determined, according to the duty cycle range of the first fan regulation and control signal and the current rotation direction of the fan, that the first fan regulation and control signal is converted to the forward-rotating control signal, counter-rotating control signal, or rotation direction switchover control signal, where the forward-rotating control signal is used to control the fan to rotate clockwise, the counter-rotating control signal is used to control the fan to rotate anticlockwise, and the rotation direction switchover control signal is used to control the fan to change the rotation direction, indicating that the fan switches from anticlockwise rotation to clockwise rotation or switches from clockwise rotation to anticlockwise rotation.

Specifically, when the fan control module receives the first fan regulation and control signal sent by the system control module, if the first fan regulation and control signal is a first PWM signal, for example, a PWM signal whose duty cycle range is from 8% to 14%, indicating that the fan rotates in a forward direction (forward-rotating), the fan control module determines that the fan rotates in the forward direction, converts the first fan regulation and control signal to the forward-rotating control signal, and sends the forward-rotating control signal to the fan driving module.

If the first fan regulation and control signal is a second PWM signal, for example, a PWM signal whose duty cycle range is from 17% to 22%, indicating that the fan rotates in a reverse direction (counter-rotating), the fan control module determines that the fan rotates in the reverse direction, converts the first fan regulation and control signal to the counter-rotating control signal, and sends the counter-rotating control signal to the fan driving module.

When the fan is in an operating state and the first fan regulation and control signal received by the fan control module from the system control module is a forward/reverse mutual switchover PWM rotation direction command, the fan control module determines, according to the duty cycle range of the first fan regulation and control signal and the current rotation direction of the fan, that the first fan regulation and control signal is the rotation direction switchover control signal for mutual switchover of a forward direction and a reverse direction. For example, if a second PWM signal is received when the fan rotates in the forward direction and a first PWM signal is received when the fan rotates in the reverse direction, it is determined that the first fan regulation and control signal is the fan rotation direction switchover control signal, the first fan regulation and control signal is converted to a corresponding rotation direction control signal, and the rotation direction control signal is sent to the fan driving module.

In the embodiment of the present invention, the forward-rotating of the fan refers to clockwise rotation, and the counter-rotating refers to anticlockwise rotation.

It should be noted that, the system control module sends the fan speed regulation signal to the fan control module according to different fan control signals.

Specifically, when the fan rotates in the forward direction, if the sent first fan regulation and control signal is the forward-rotating control signal indicating the same rotation direction as the current rotation direction of the fan, the system control module immediately sends the first fan regulation and control signal to the fan control module; and if the first fan regulation and control signal is the counter-rotating control signal or the rotation direction switchover control signal, the system control module sends the first fan regulation and control signal to the fan control module after first preset duration expires and the fan stops rotating, so as to prevent the fan from being damaged and extend service life of the fan.

Similarly, when the fan rotates in the reverse direction, if the sent first fan regulation and control signal is the counter-rotating control signal indicating the same rotation direction as the current rotation direction of the fan, the system control module immediately sends the first fan regulation and control signal to the fan control module; and if the first fan regulation and control signal is the forward-rotating control signal or the rotation direction switchover control signal, the system control module sends the first fan regulation and control signal to the fan control module after first preset duration expires and the fan stops rotating, so as to prevent the fan from being damaged and extend service life of the fan.

The preset duration is duration for waiting for the fan to stop rotating, for example, 10 s, which may be preset according to a specific system condition.

203: Send a control signal obtained by the conversion to a fan driving module, so that the fan driving module drives, according to the control signal obtained by the conversion, the fan to operate.

The forward-rotating control signal, counter-rotating control signal, or rotation direction switchover control signal obtained by the conversion is sent to the fan driving module, and the fan driving module performs power output transformation and drives a motor module of the fan to perform corresponding rotation.

204: Send a speed regulation driving signal to the fan driving module according to a duty cycle range of a received second fan control signal.

A rotational speed of the fan is regulated according to the fan rotational speed information and the second fan regulation and control signal that are received. Specifically, the second fan regulation and control signal sent by the system control module is received, where the second fan regulation and control signal is used to regulate the rotational speed of the fan. The speed regulation driving signal is sent to the fan driving module according to the duty cycle range of the second fan regulation and control signal, so that the fan driving module drives the fan to rotate at a rotational speed corresponding to the duty cycle range of the second fan regulation and control signal, and fan power can be regulated, so that the rotational speed of the fan meets a system requirement.

205: Send rotational speed information of the fan to the system control module.

After the rotational speed of the fan is regulated and the rotational speed of the fan is stable, the fan control module reports the rotational speed information of the fan to the system control module, and the motor rotational speed detection module detects a rotational speed of a motor of the fan and sends rotational speed information of the motor of the fan to the fan control module.

206: When it is detected that the first fan regulation and control signal or the second fan regulation and control signal is a fault signal, send a fan full speed driving control signal to the fan driving module, where the fan full speed driving control signal is used to drive a motor module to rotate at full speed.

When the fan control module detects that the first fan control signal is a fault signal or detects that the second fan control signal is a fault signal, that is, a PWM signal sent by the system control module is constantly low or constantly high, for example, a PWM signal whose duty cycle range is from 0% to 5% or from 95% to 100%, the fan control module receives fault information of the duty cycle range by using the control bus and sends the fan full speed driving control signal to the fan driving module to drive the motor module to rotate in the forward or reverse direction at full speed and to rotate at full speed with full power. The fan driving module completes power output transformation and drives the motor module to rotate in the forward or reverse direction at full speed, thereby preferentially meeting a system heat dissipation requirement when the fan encounters a fault. Certainly, a fan full speed driving control signal may also not be sent to the fan driving module; instead, a current rotation state of the fan is retained, and a fan rotation direction module completes rotational speed detection of the fan and reports a detection result to the fan control module.

In the embodiment of the present invention, a fan control module converts a first fan regulation and control signal to a forward-rotating control signal, a counter-rotating control signal, and a rotation direction switchover control signal, and sends a control signal obtained by the conversion to a fan driving module, so as to drive a fan to operate according to the control signal; in addition, a rotational speed of the fan is regulated according to rotational speed information of the fan that is detected by a motor rotational speed detection module and received and a second fan regulation and control signal that is sent by a system control module and received, so as to enable the rotational speed of the fan to meet a system requirement, solve a problem that a counter-rotating signal input and output interface needs to be specifically provided in a fan interface, and implement rotation direction and rotational speed control on the fan by using a four-wire system interface. In addition, if the fan control signal received by the fan control module is a fault signal, a fan full speed driving control signal is sent to the fan driving module, so that the fan driving module drives a motor module to rotate at full speed, thereby preferentially meeting a heat dissipation requirement when a system encounters a fault.

Figure 4:
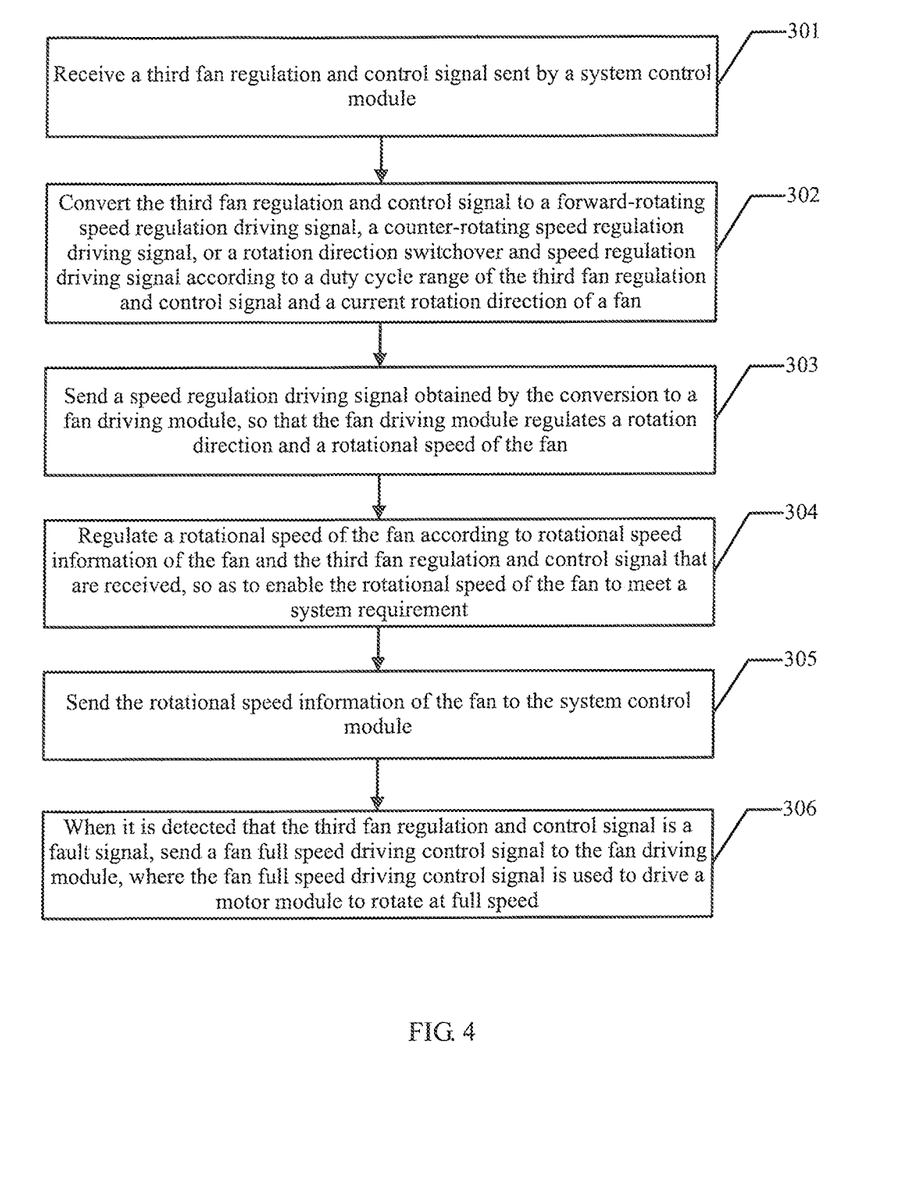
FIG. 4 is a schematic diagram of a fan control method according to an embodiment of the present invention.

In the foregoing embodiment, three duty cycle ranges are pre-divided for a PWM signal, which represent a fan forward-rotating control signal, a counter-rotating control signal, and a fan rotational speed regulation signal. Fan rotation is regulated and controlled according to the three duty cycle ranges. Two duty cycle ranges may also be pre-divided for a PWM signal, which represent a fan forward-rotating speed regulation signal and a counter-rotating speed regulation signal. Referring to FIG. 4, a fan control method provided in still another embodiment of the present invention includes:

301: Receive a third fan regulation and control signal sent by a system control module.

After a system is powered on, the system control module sends the fan regulation and control signal to a fan control module by using a fan interface; the system control module may further acquire, by using a control bus, information reported by an environment detection module, may also receive, by using an intelligent data bus, a fan speed regulation command sent by a host computer, and may further receive, by using the control bus, fan rotational speed information reported by a motor rotational speed detection module and the fan control module.

The fan control module receives the third fan regulation and control signal sent by the system control module, where the third fan regulation and control signal is used to simultaneously control a rotation direction and a rotational speed of a fan, and the system control module is configured to deliver a control signal according to an instruction of the host computer to control operating of the fan.

302: Convert the third fan regulation and control signal to a forward-rotating speed regulation driving signal, a counter-rotating speed regulation driving signal, or a rotation direction switchover and speed regulation driving signal according to a duty cycle range of the third fan regulation and control signal and a current rotation direction of a fan.

It should be noted that, the fan regulation and control signal is a PWM signal. The PWM signal may be classified, according to different duty cycle ranges, into regulation and control signals for identifying different regulation and control information.

In this embodiment, it can be determined, according to the duty cycle range of the third fan regulation and control signal and the current rotation direction of the fan, that the third fan regulation and control signal is converted to the forward-rotating speed regulation driving signal, counter-rotating speed regulation driving signal, or rotation direction switchover and speed regulation driving signal, where the forward-rotating speed regulation driving signal is used to control the fan to rotate clockwise and regulate the rotational speed of the fan, the counter-rotating speed regulation driving signal is used to control the fan to rotate anticlockwise and regulate the rotational speed of the fan, and the rotation direction switchover and speed regulation driving signal is used to control the fan to change the rotation direction and regulate the rotational speed of the fan, where changing the rotation direction indicates that the fan switches from anticlockwise rotation to clockwise rotation or switches from clockwise rotation to anticlockwise rotation.

Specifically, when the fan control module receives the third fan regulation and control signal sent by the system control module, if the third fan regulation and control signal is a third PWM signal, for example, a PWM signal whose duty cycle range is from 5% to 45%, indicating a forward-rotating speed regulation driving signal, the fan control module determines that the third fan regulation and control signal is the forward-rotating speed regulation driving signal, converts the third fan regulation and control signal to the forward-rotating speed regulation driving signal, and sends the forward-rotating speed regulation driving signal to the fan driving module.

If the third fan regulation and control signal is a fourth PWM signal, for example, a PWM signal whose duty cycle range is from 55% to 95%, indicating a counter-rotating speed regulation driving signal, the fan control module determines that the third fan regulation and control signal is the counter-rotating speed regulation driving signal, converts the third fan regulation and control signal to the counter-rotating speed regulation driving signal, and sends the counter-rotating speed regulation driving signal to the fan driving module.

It should be noted that, the system control module sends the fan speed regulation signal to the fan control module according to different fan control signals.

Specifically, when the fan rotates in a forward direction, if the sent third fan regulation and control signal is the forward-rotating speed regulation driving signal indicating the same rotation direction as the current rotation direction of the fan, the system control module immediately sends the third fan regulation and control signal to the fan control module; and if the third fan regulation and control signal is the counter-rotating speed regulation driving signal or the rotation direction switchover and speed regulation driving signal, the system control module sends the third fan regulation and control signal to the fan control module after second preset duration expires and the fan stops rotating, so as to prevent the fan from being damaged and extend service life of the fan.

Similarly, when the fan rotates in a reverse direction, if the sent third fan regulation and control signal is the counter-rotating speed regulation driving signal indicating the same rotation direction as the current rotation direction of the fan, the system control module immediately sends the third fan regulation and control signal to the fan control module; and if the third fan regulation and control signal is the forward-rotating speed regulation driving signal or the rotation direction switchover and speed regulation driving signal, the system control module sends the third fan regulation and control signal to the fan control module after second preset duration expires and the fan stops rotating, so as to prevent the fan from being damaged and extend service life of the fan.

Time of the preset duration is duration for waiting for the fan to stop rotating, for example, 20 s, which may be preset according to a specific system condition.

303: Send a speed regulation driving signal obtained by the conversion to a fan driving module, so that the fan driving module regulates a rotation direction and a rotational speed of the fan according to the speed regulation driving signal obtained by the conversion.

The forward-rotating speed regulation driving signal, counter-rotating speed regulation driving signal, or rotation direction switchover and speed regulation driving signal obtained by the conversion is sent to the fan driving module. The fan driving module performs power output transformation and drives a motor module of the fan to operate according to a corresponding rotation direction and rotational speed.

304: Regulate the rotational speed of the fan according to rotational speed information of the fan and the third fan regulation and control signal that are received, so as to enable the rotational speed of the fan to meet a system requirement.

The rotational speed information of the fan detected by the motor rotational speed detection module is received, and the rotational speed of the fan is regulated according to the rotational speed information of the fan and the third fan regulation and control signal. Specifically, a power driving signal can be regulated to enable the rotational speed of the fan to meet the system requirement.

In this embodiment, the motor rotational speed detection module detects a rotational speed of a motor of the fan and sends rotational speed information of the motor of the fan to the fan control module.

305: Send the rotational speed information of the fan to the system control module.

After the rotational speed of the fan is regulated and the rotational speed of the fan is stable, the fan control module reports the rotational speed information of the fan to the system control module, and the motor rotational speed detection module detects the rotational speed of the motor of the fan and sends the rotational speed information of the motor of the fan to the fan control module.

306: When it is detected that the third fan regulation and control signal is a fault signal, send a fan full speed driving control signal to the fan driving module, where the fan full speed driving control signal is used to drive a motor module to rotate at full speed.

When the fan control module detects that the third fan control signal is a fault signal, that is, a PWM signal sent by the system control module is constantly low or constantly high, for example, a PWM signal whose duty cycle range is from 0% to 5% or from 95% to 100%, the fan control module receives fault information of the duty cycle range by using the control bus and sends the fan full speed driving control signal to the fan driving module to drive the motor module to rotate in the forward or reverse direction at full speed and to rotate at full speed with full power. The fan driving module completes power output transformation and drives the motor module to rotate in the forward or reverse direction at full speed, thereby preferentially meeting a system heat dissipation requirement when the fan encounters a fault. Certainly, a fan forward full speed driving control signal may also not be sent to the fan driving module; instead, a current rotation state of the fan is retained, and a fan rotation direction module completes rotational speed detection of the fan and reports a detection result to the fan control module.

In the embodiment of the present invention, a fan control module converts a third fan regulation and control signal sent by a system control module to a forward-rotating speed regulation driving signal, a counter-rotating speed regulation driving signal, or a rotation direction switchover and speed regulation driving signal, and sends a speed regulation driving signal obtained by the conversion to a fan driving module, so as to drive a fan to operate according to the speed regulation driving signal; in addition, a rotational speed of the fan is regulated according to rotational speed information of the fan that is detected by a motor rotational speed detection module and received and the received third fan regulation and control signal, so as to enable the rotational speed of the fan to meet a system requirement, solve a problem that a counter-rotating signal input and output interface needs to be specifically provided in a fan interface, and implement rotational speed and speed regulation control on the fan by using a four-wire system interface. In addition, if the fan control signal received by the fan control module is a fault signal, a fan full speed driving control signal is sent to the fan driving module, so that the fan driving module drives a motor module to rotate at full speed, thereby preferentially meeting a heat dissipation requirement when a system encounters a fault.

Figure 5:
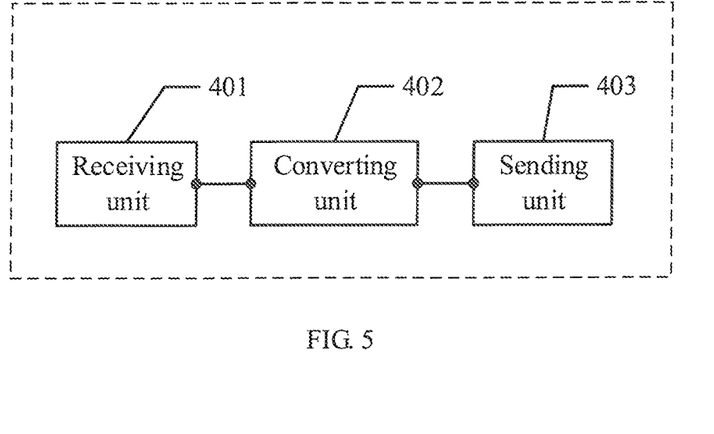
FIG. 5 is a schematic diagram of a fan control apparatus according to an embodiment of the present invention.

The following describes a fan control apparatus in an embodiment of the present invention. Referring to FIG. 5, the fan control apparatus provided in the embodiment of the present invention includes:

a receiving unit 401, configured to receive a first fan regulation and control signal sent by a system control module, where the first fan regulation and control signal is used to control a rotation direction of a fan, and the system control module is configured to deliver a control signal according to an instruction of a host computer to control operating of the fan;

a converting unit 402, configured to convert the first fan regulation and control signal received by the receiving unit 401 to a forward-rotating control signal, a counter-rotating control signal, or a rotation direction switchover control signal according to a duty cycle range of the first fan regulation and control signal and a current rotation direction of the fan; and a sending unit 403, configured to send a control signal obtained by the conversion by the converting unit 402 to a fan driving module, so that the fan driving module drives, according to the control signal obtained by the conversion, the fan to operate.

For a specific process of implementing a function of each unit of the fan control apparatus in the embodiment of the present invention, reference may be made to the description in the foregoing embodiment shown in FIG. 2, and details are not repeatedly described herein.

In the embodiment of the present invention, a receiving unit 401 receives a first fan regulation and control signal sent by a system control module, where the first fan regulation and control signal is used to control a rotation direction of a fan; a converting unit 402 converts the first fan regulation and control signal received by the receiving unit 401 to a forward-rotating control signal, a counter-rotating control signal, or a rotation direction switchover control signal according to a duty cycle range of the first fan regulation and control signal and a current rotation direction of the fan; and a sending unit 403 sends the forward-rotating control signal, counter-rotating control signal, or rotation direction switchover control signal obtained by the conversion by the converting 402 to a fan driving module, so that the fan driving module drives, according to a control signal obtained by the conversion, the fan to operate, so as to implement a control function for controlling a direction of the fan, solve a problem that a reverse rotation direction signal input and output interface needs to be specifically provided in an fan interface, implementing rotation direction control on the fan by using a four-wire system interface, be compatible with forward and reverse air ducts under a precondition that a counter-rotating fan interface and an existing four-wire system interface are consistent, implement smooth upgrade and transformation of a device on an existing network, and reduce operation and maintenance costs.

Figure 6:
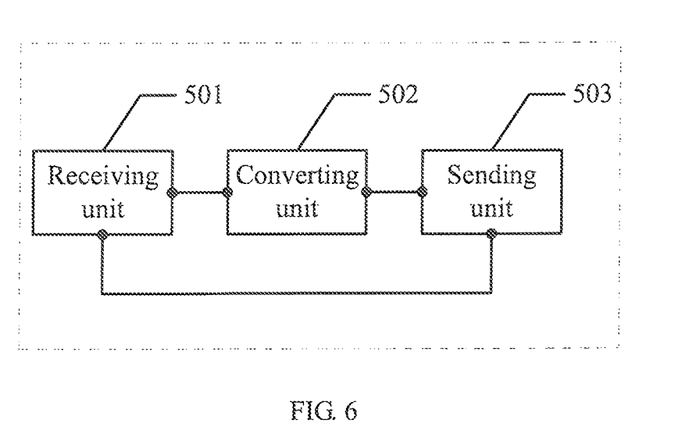
FIG. 6 is a schematic diagram of a fan control apparatus according to an embodiment of the present invention.

For ease of understanding, the following uses another embodiment to describe in detail the fan control apparatus according to the embodiment of the present invention. Referring to FIG. 6, the fan control apparatus provided in the another embodiment of the present invention includes:

a receiving unit 501, configured to receive a first fan regulation and control signal sent by a system control module, where the first fan regulation and control signal is used to control a rotation direction of a fan, and the system control module is configured to deliver a control signal according to an instruction of a host computer to control operating of the fan;

a converting unit 502, configured to convert the first fan regulation and control signal received by the receiving unit 501 to a forward-rotating control signal, a counter-rotating control signal, or a rotation direction switchover control signal according to a duty cycle range of the first fan regulation and control signal and a current rotation direction of the fan; and a sending unit 503, configured to send a control signal obtained by the conversion by the converting unit 502 to a fan driving module, so that the fan driving module drives, according to the control signal, the fan to operate.

Further, the receiving unit 501 is further configured to receive a second fan regulation and control signal sent by the system control module, where the second fan regulation and control signal is used to regulate a rotational speed of the fan; and the sending unit 503 is further configured to send a speed regulation driving signal to the fan driving module according to a duty cycle range of the second fan regulation and control signal, so that the fan driving module drives the fan to operate at a rotational speed corresponding to the duty cycle range of the second fan regulation and control signal.

Still further, the sending unit 503 is further configured to send rotational speed information of the fan to the system control module, so that the system control module reports the rotational speed information of the fan to the host computer; and the sending unit 503 is further configured to: when it is detected that the first fan regulation and control signal or the second fan control signal is a fault signal, send a fan full speed driving control signal to the fan driving module, so that the fan rotates at full speed.

For a specific process of implementing a function of each unit of the fan control apparatus in the embodiment of the present invention, reference may be made to the description in the foregoing embodiment shown in FIG. 2 and FIG. 3, and details are not repeatedly described herein.

In the embodiment of the present invention, a receiving unit 501 receives a first fan regulation and control signal sent by a system control module, where the first fan regulation and control signal is used to control a rotation direction of a fan; a converting unit 502 converts the first fan regulation and control signal received by the receiving unit 501 to a forward-rotating control signal, a counter-rotating control signal, or a rotation direction switchover control signal according to a duty cycle range of the first fan regulation and control signal and a current rotation direction of the fan; a sending unit 503 sends a control signal obtained by the conversion by the converting unit 502 to a fan driving module, so that the fan driving module drives, according to the control signal obtained by the conversion, the fan to operate; the receiving unit 501 receives a second fan regulation and control signal sent by the system control module; the sending unit 503 is further configured to send a speed regulation driving signal to the fan driving module according to a duty cycle range of the second fan regulation and control signal, so that the fan driving module drives the fan to operate at a rotational speed corresponding to the duty cycle range of the second fan regulation and control signal, where the second fan regulation and control signal is used to regulate the rotational speed of the fan to enable the rotational speed of the fan to meet a system requirement; the sending unit 503 sends rotational speed information of the fan to the system control module; and when the fan control module detects that the first fan regulation and control signal or the second fan control signal is a fault signal, the sending unit 503 sends a fan full speed driving control signal to the fan driving module, so that the fan rotates at full speed, thereby solving a problem that a counter-rotating signal input and output interface needs to be specifically provided in an fan interface, and implementing rotation direction and rotational speed control on the fan by using a four-wire system interface. In addition, if the fan control signal received by the fan control module is a fault signal, the fan full speed driving control signal is sent to the fan driving module, so that the fan driving module drives a motor module to rotate at full speed, thereby preferentially meeting a heat dissipation requirement when a system encounters a fault.

Figure 7:
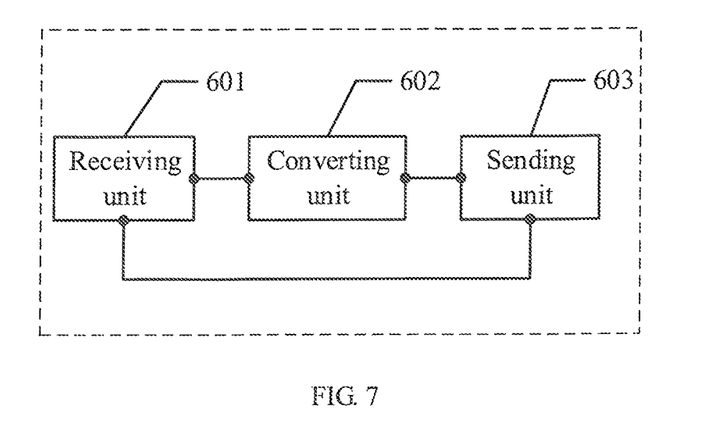
FIG. 7 is a schematic diagram of a fan control apparatus according to an embodiment of the present invention.

Referring to FIG. 7, a fan control apparatus provided in another embodiment of the present invention includes:

a receiving unit 601, configured to receive a third fan regulation and control signal sent by a system control module, where the third fan regulation and control signal is used to simultaneously control a rotation direction and a rotational speed of a fan;

a converting unit 602, configured to convert the third fan regulation and control signal received by the receiving unit to a forward-rotating speed regulation driving signal, a counter-rotating speed regulation driving signal, or a rotation direction switchover and speed regulation driving signal according to a duty cycle range of the third fan regulation and control signal received by the receiving unit 601 and a current rotation direction of the fan; and a sending unit 603, configured to send a speed regulation driving signal obtained by the conversion by the converting unit 602 to a fan driving module, so that the fan driving module regulates the rotation direction and the rotational speed of the fan according to the speed regulation driving signal obtained by the conversion.

Further, the sending unit 603 is further configured to send rotational speed information of the fan to the system control module, so that the system control module reports the rotational speed information of the fan to the host computer; and the sending unit 603 is further configured to: when it is detected that the third fan regulation and control signal is a fault signal, send a fan full speed driving control signal to the fan driving module, so that the fan rotates at full speed.

For a specific process of implementing a function of each unit of the fan control apparatus in the embodiment of the present invention, reference may be made to the description in the foregoing embodiments shown in FIG. 2, FIG. 3, and FIG. 4, and details are not repeatedly described herein.

In the embodiment of the present invention, a receiving unit 601 receives a third fan regulation and control signal sent by a system control module, where the third fan regulation and control signal is used to simultaneously control a rotation direction and a rotational speed of a fan; a converting unit 602 converts the third fan regulation and control signal received by the receiving unit to a forward-rotating speed regulation driving signal, a counter-rotating speed regulation driving signal, or a rotation direction switchover and speed regulation driving signal according to a duty cycle range of the third fan regulation and control signal received by the receiving unit 601 and a current rotation direction of the fan; the sending unit 603 sends a speed regulation driving signal obtained by the conversion by the converting unit to a fan driving module, so that the fan driving module regulates the rotation direction and the rotational speed of the fan according to the speed regulation driving signal obtained by the conversion; further, the sending unit 603 sends rotational speed information of the fan to the system control module; and when the fan control module detects that the third fan regulation and control signal is a fault signal, the sending unit 603 sends a fan full speed driving control signal to the fan driving module, so that the fan rotates at full speed, thereby solving a problem that a counter-rotating signal input and output interface needs to be specifically provided in an fan interface, and implementing rotational speed and speed regulation control on the fan by using a four-wire system interface. In addition, if the fan control signal received by the fan control module is a fault signal, a fan full speed driving control signal is sent to the fan driving module, so that the fan driving module drives a motor module to rotate at full speed, thereby preferentially meeting a heat dissipation requirement when a system encounters a fault.

Figure 8:
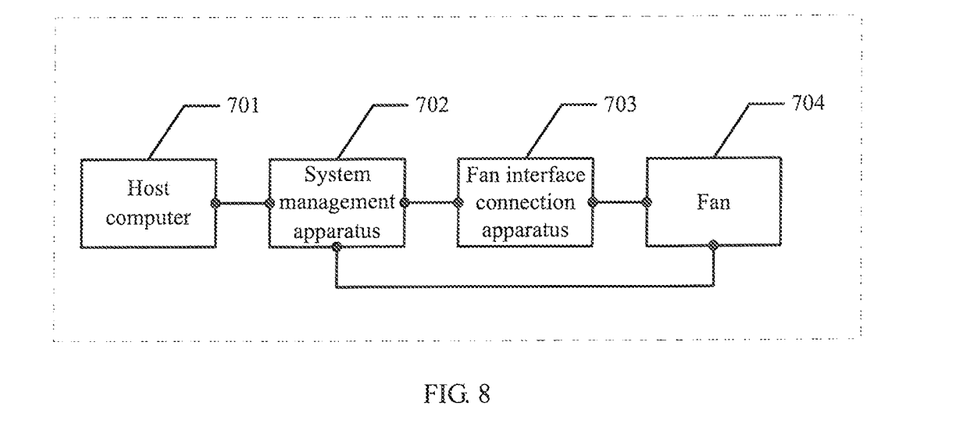
FIG. 8 is a schematic diagram of a fan control system according to an embodiment of the present invention.

An embodiment of the present invention further provides a fan control system. Referring to FIG. 8, the fan control system in the embodiment of the present invention includes:

a host computer 701, a system management apparatus 702, a fan interface connection apparatus 703, and a fan 704, where:

the host computer 701 is connected to the system management apparatus 702 and is configured to send a rotation direction control command to the system management apparatus 702;

the system management apparatus 702 is connected to the host computer 701 and the fan interface connection apparatus 703 and is configured to send a first fan control signal to the fan 704 by using the fan interface connection apparatus 702 and according to the rotation direction control command;

the fan interface connection apparatus 703 is configured to connect the system management apparatus 702 to the fan 704, and the fan interface connection apparatus 703 includes a power supply positive interface, a power supply negative interface, a fan control signal interface, and a fan rotational speed frequency feedback signal interface, where a fan rotational speed frequency feedback signal (frequency signal) is mainly used for identifying a fault state and a rotational speed of the fan; one side of the power supply positive interface and one side of the power supply negative interface are respectively connected to a positive electrode and a negative electrode of a power supply in the system management apparatus by using a power supply bus; another side of the power supply positive interface and another side of the power supply negative interface are respectively connected to a positive electrode and a negative electrode of the fan by using a power supply bus; one side of the fan control signal interface and one side of the fan rotational speed frequency feedback signal interface are connected to a signal control interface in the system management apparatus 702 by using a control bus; and another side of the fan control signal interface and another side of the fan rotational speed frequency feedback signal interface are connected to the fan 704 by using a control bus; and the fan 704 is connected to the fan interface connection apparatus 703 and is configured to regulate the rotation direction and the rotational speed according to the received first fan control signal, second fan control signal, or third fan control signal; and the fan 704 is a four-wire system fan and is configured to receive the first fan regulation and control signal sent by the system management apparatus 702, where the first fan regulation and control signal is used to control the rotation direction of the fan, convert the first fan regulation and control signal to a forward-rotating control signal, a counter-rotating control signal, or a rotation direction switchover control signal according to a duty cycle range of the first fan regulation and control signal and a current rotation direction of the fan, and regulate the rotation direction of the fan according to a control signal obtained by the conversion.

Further, the host computer 701 is further configured to send a speed regulation control command to the system management apparatus 702;

the system management apparatus 702 is further configured to send a second fan control signal to the fan 704 by using the fan interface connection apparatus 703 and according to the speed regulation control command; and the fan 704 is further configured to receive the second fan regulation and control signal sent by the system management apparatus 702 and enable, according to a duty cycle range of the second fan regulation and control signal, the fan to operate at a rotational speed corresponding to the duty cycle range of the second fan regulation and control signal.

A person skilled in the art may understand that all or a part of the steps of the method in the embodiments of the present invention may be implemented by a program instructing relevant hardware. The program may be stored in a computer readable storage medium. The storage medium may be a read-only memory, a magnetic disk, an optical disc, or the like.

The foregoing describes the fan control method, apparatus, and system provided by the present invention in detail, and a person skilled in the art may make variations to specific implementation manners and the application scope according to the idea of the embodiments of the present invention. In conclusion, content of this specification shall not be understood as a limitation on the present invention.

What is claimed is:

1. A fan control method, comprising:
   receiving a first fan regulation and control signal and a fan rotation direction and a fan rotation speed, wherein the first fan regulation and control signal is a pulse width modulation (PWM) signal having a duty cycle within one of a plurality of duty cycle ranges;
   outputting:
      a forward-rotating control signal when the fan rotation direction and the fan rotation speed correspond to a fan not rotating and the PWM signal of the first fan regulation and control signal is a first PWM signal having its duty cycle within a first range of the plurality of duty cycle ranges,
      a counter-rotating control signal when the fan rotation direction and the fan rotation speed correspond to the fan not rotating and the PWM signal of the first fan regulation and control signal is a second PWM signal having its duty cycle within a second range of the plurality of duty cycle ranges, and
      a rotation direction switchover control signal when the fan rotation direction and the fan rotation speed correspond to the fan rotating in one of a forward-rotating direction or a counter-rotating direction and the PWM signal of the first fan regulation and control signal corresponds to rotation of the fan in an opposite direction; and
   sending the output one of the forward-rotating control signal, the counter-rotating control signal, and the rotation direction switchover control signal to a fan driving module, for driving the fan in the forward-rotating direction when the forward-rotating control signal is sent, in the counter-rotating direction when the counter-rotating control signal is sent, and to reverse the direction of rotation when the rotation direction switchover control signal is sent.

2. The fan control method according to claim 1, wherein after sending the forward-rotating control signal, the counter-rotating control signal, and the rotation direction switchover control signal to a fan driving module, the method further comprises:
   receiving a second fan regulation and control signal, wherein the second fan regulation and control signal is another PWM signal having its duty cycle within one of the plurality of duty cycle ranges; and
   sending a speed regulation driving signal to the fan driving module according to the duty cycle range of the second fan regulation and control signal, so that the fan driving module drives the fan to operate at a rotational speed corresponding to the duty cycle range of the second fan regulation and control signal.

3. The fan control method according to claim 1, further comprising:
   receiving a second fan regulation and control signal, wherein the second fan regulation and control signal is another PWM signal having its duty cycle within one of the plurality of duty cycle ranges;
   outputting:
      a forward-rotating speed regulation driving signal when the fan rotation direction and the fan rotation speed correspond to a fan not rotating and the PWM signal of the second fan regulation and control signal is a third PWM signal having its duty cycle within a third range of the plurality of duty cycle ranges,
      a counter-rotating speed regulation driving signal when the fan rotation direction and the fan rotation speed correspond to the fan state not rotating and the PWM signal of the second fan regulation and control signal is a fourth PWM signal having its duty cycle within a fourth range of the plurality of duty cycle ranges, and
      a rotation direction switchover and speed regulation driving signal when the fan rotation direction and the fan rotation speed correspond to the fan rotating in one of the forward-rotating direction or the counter-rotating direction and the PWM signal of the second fan regulation and control signal corresponds to rotation of the fan in an opposite direction; and
   sending the output one of the forward-rotating speed regulation driving signal, the counter-rotating speed regulation driving signal, and the rotation direction switchover and speed regulation driving signal to the fan driving module, so that the fan driving module regulates the rotation direction and the rotational speed of the fan to be in the forward-rotating direction when the forward-rotating speed regulation driving signal is sent, to be in the counter-rotating direction when the counter-rotating speed regulation driving signal is sent, and to reverse the direction of rotation when the rotation direction switchover and speed regulation driving signal is sent.

4. The fan control method according, to claim 2, further comprising:
   sending rotational speed information of the fan to the system control module.

5. The fan control method according to claim 3, further comprising:
   sending a fan full speed driving control signal to the fan driving module when it is detected that the first fan regulation and control signal or the second fan regulation and control signal has its duty cycle within a range of the plurality of duty cycle ranges corresponding to a fault signal, so that the fan operates at full speed.

6. The fan control method according to claim 2, further comprising:
   sending a fan full speed driving control signal to the fan driving module when it is detected that the first fan regulation and control signal or the second fan regulation and control signal has its duty cycle within a range of the plurality of duty cycle ranges corresponding to a fault signal, so that the fan operates at full speed.

7. A fan control apparatus connectable with a four-wire system interface having a power supply positive electrode wire, a power supply negative electrode wire, a pulse width modulation (PWM) signal input and output wire, and a fan rotational speed frequency signal (FG) input and output wire, the fan control apparatus comprising:
   a first electrical connection to at least one of the power supply positive electrode wire and the negative power supply electrode wire of the four-wire system interface;
   a second electrical connection to the PWM signal input and output wire of the four-wire system interface;
   a third electrical connection to the PG input and output wire of the four-wire system interface;
   a receiving unit electrically connected to the second electrical connection and configured to receive a first fan regulation and control signal, wherein the first fan regulation and control signal is a PWM signal having a duty cycle within one of a plurality of duty cycle ranges;
   a converting unit operably connected to the receiving unit and configured to obtain the first fan regulation and control signal received by the receiving unit and connectable to a motor rotational speed detection module to receive a fan rotation direction and a fan rotation speed and to output;
  a forward-rotating control signal when the fan rotation direction and the fan rotation speed received by the converting unit correspond to a fan not rotating and the PWM signal of the first fan regulation and control signal is a first PWM signal having its duty cycle within a first range of the plurality of duty cycle ranges,
  a counter-rotating control signal when the fan rotation direction and the fan rotation speed received by the converting unit correspond to the fan not rotating and the PWM signal of the first fan regulation and control signal is a second PWM signal having its duty cycle within a second range of the plurality of duty cycle ranges, or
  a rotation direction switchover control signal when the fan rotation direction and the fan rotation speed received by the converting unit correspond to the fan rotating in one of a forward-rotating direction or a counter-rotating, direction and the PWM signal of the first fan regulation and control signal corresponds to rotation of the fan in an opposite direction; and
a sending unit operably connected to the converting unit to obtain the output one of the forward-rotating control signal, the counter-rotating control signal, or the rotation direction switchover control signal output from the converting unit, the sending unit being connectable to a fan driving module so that the fan driving, module obtains the output one of the forward-rotating control signal, the counter-rotating control signal, or the rotation direction switchover control signal from the sending unit for driving the fan to rotate in the forward-rotating direction when the forward-rotating control signal is obtained, rotate in the counter-rotating direction when the counter-rotating control signal is obtained, or reverse the rotation direction when the rotation direction switchover control signal is obtained.

8. The fan control apparatus according to claim 7, wherein:
  the receiving unit is further configured to receive a second fan regulation and control signal from the second electrical connection, wherein the second fan regulation and control signal is another PWM signal having its duty cycle within one of the plurality of duty cycle ranges; and
  the sending unit is further configured to output a speed regulation driving signal to the fan driving module according to the duty cycle range of the second fan regulation and control signal, so that the fan driving module drives the fan to operate at a rotational speed corresponding to the duty cycle range of the second fan regulation and control signal.

9. The fan control apparatus according to claim 7, wherein:
  the receiving unit is further configured to receive a second fan regulation and control signal from the second electrical connection, wherein the second fan regulation and control signal is another PWM signal having its duty cycle within one of the plurality of duty cycle ranges;
  the converting unit is further configured to obtain the second fan regulation and control signal and to output:
    a forward-rotating speed regulation driving signal when the fan rotation direction and the fan rotation speed received by the converting unit correspond to a fan not rotating and the PWM signal of the second fan regulation and control signal is a third PWM signal having its duty cycle within a third range of the plurality of duty cycle ranges,
    a counter-rotating speed regulation driving signal when the fan rotation direction and the fan rotation speed received by the converting unit correspond to the fan not rotating and the PWM signal of the second fan regulation and control signal is a fourth PWM signal having its duty cycle within a fourth range of the plurality of duty cycle ranges, or
    a rotation direction switchover and speed regulation driving signal when the fan rotation direction and the fan rotation speed received by the converting unit correspond to the fan rotating in one of the forward-rotating direction or the counter-rotating direction and the PWM signal of the second fan regulation and control signal corresponds to rotation of the fan in an opposite direction; and
  the sending unit is farther configured to obtain the forward-rotating speed regulation driving signal, the counter-rotating speed regulation driving signal, and the rotation direction switchover and speed regulation driving signal from the converting unit, so that the fan driving module obtains the forward-rotating speed regulation driving signal, the counter-rotating speed regulation driving signal, or the rotation direction switchover and speed regulation driving signal from the sending unit and regulates the rotation direction and the rotational speed of the fan to rotate in the forward-rotating direction when the forward-rotating speed regulation driving signal is obtained, rotate in the counter-rotating direction when the counter-rotating speed regulation driving signal is obtained, and reverse the rotation direction when the rotation direction switchover and speed regulation driving signal is obtained.

10. The fan control apparatus according to claim 9, wherein:
  the sending unit is further electrically connected to the third electrical connection and configured to send rotational speed information of the fan to the PG input and output wire.

11. The fan control apparatus according to claim 8, wherein:
  the sending unit is further configured to: output a fan full speed driving control signal to the fan driving module when it is detected that the first fan regulation and control signal or the second fan regulation and control signal has its duty cycle within a range of the plurality of duty cycle ranges corresponding to a fault signal, so that the fan operates at full speed.

12. The fan control apparatus according to claim 9, wherein:
  the sending, unit is further configured to: output a fan full speed driving control signal to the fan driving module when it is detected that the first fan regulation and control signal or the second fan regulation and control signal has its duty cycle within a range of the plurality of duty cycle ranges corresponding to a fault signal, so that the fan operates at full speed.

13. A fan control system, comprising:
a host computer, a system management apparatus, a fan interface connection apparatus, and a fan, wherein:
  the host computer is connected to a data bus and configured to send a rotation direction control command onto the data bus;

the system management apparatus is connected to the data bus and configured to obtain the rotation direction control command and to send a first fan control signal to the fan by using the fan interface connection apparatus, wherein the first fan control signal is a pulse width modulation (PWM) signal having its duty cycle within one of a plurality of duty cycle ranges selected according to the rotation direction control command;

the fan interface connection apparatus electrically connects the system management apparatus to the fan, and comprises a power supply positive interface, a power supply negative interface, a fan control signal interface, and a fan rotational speed frequency feedback signal interface, wherein one side of the power supply positive interface and one side of the power supply negative interface are respectively connected to a positive electrode and a negative electrode of a power supply in the system management apparatus by using a power supply bus, another side of the power supply positive interface and another side of the power supply negative interface are respectively connected to a positive electrode and a negative electrode of the fan by using a power supply bus, one side of the fan control signal interface and one side of the fan rotational speed frequency feedback signal interface are connected to a signal control interface in the system management apparatus by using a control bus, and another side of the fan control signal interface and another side of the fan rotational speed frequency feedback signal interface are connected to the fan by using the control bus; and the fan is a four-wire system fan and is configured to connect to the fan control signal interface to obtain the first fan regulation and control signal sent by the system management apparatus and to output:

a forward-rotating, control signal when a fan rotation direction and a fan rotation speed of the fan correspond to the fan not rotating and the PWM signal of the first fan regulation and control signal is a first PWM signal having its duty cycle within a first range of the plurality of duty cycle ranges, a counter-rotating control signal when the fan rotation direction and the fan rotation speed of the fan correspond to the fan not rotating and the PWM signal of the first fan regulation and control signal is a second PWM signal having its duty cycle within a second range of the plurality of duty cycle ranges, or a rotation direction switchover control signal when the fan rotation direction and the fan rotation speed of the fan correspond to the fan rotating in one of a forward-rotating direction or a counter-rotating direction and the PWM signal of the first fan regulation and control signal corresponds to rotation of the fan in an opposite direction, and such that the rotation direction of the fan will he in the forward-rotating direction when the forward-rotating control signal is output, will be in the counter-rotating direction when the counter-rotating control signal is output, or will reverse the direction of rotation when the rotation direction switchover control signal is output.

14. The fan control system according to claim 13, wherein:

the host computer is further connected to the data bus and configured to send a speed regulation control command onto the data bus;

the system management apparatus is further configured to connect to the data bus to obtain the speed regulation control command and to send a second fan control signal to the fan by using the fan control signal interface of the fan interface connection apparatus, wherein the second fan control signal is another PWM signal having its duty cycle within one of the plurality of duty cycle ranges selected according to the speed regulation control command; and the fan is further configured to receive the second fan regulation and control signal sent by the system management apparatus and operate at a rotational speed corresponding to the duty cycle range of the second fan regulation and control signal.

* * * * *